United States Patent
Sun et al.

(10) Patent No.: US 10,094,613 B2
(45) Date of Patent: Oct. 9, 2018

(54) ULTRAVIOLET CURING MODULE

(71) Applicant: PlayNitride Inc., Grand Cayman (KY)

(72) Inventors: Sheng-Yuan Sun, Tainan (TW); Robert K. Karlicek, Clifton Park, NY (US); Kuan-Chun Huang, Tainan (TW)

(73) Assignee: PlayNitride Inc., Grand Cayman (KY)

( * ) Notice: Subject to any disclaimer, the term of this patent is extended or adjusted under 35 U.S.C. 154(b) by 47 days.

(21) Appl. No.: 15/412,061

(22) Filed: Jan. 23, 2017

(65) Prior Publication Data

US 2018/0209730 A1 Jul. 26, 2018

(51) Int. Cl.
| | |
|---|---|
| *F26B 3/28* | (2006.01) |
| *G02B 5/10* | (2006.01) |
| *H01J 61/20* | (2006.01) |
| *G02B 5/08* | (2006.01) |
| *G02B 19/00* | (2006.01) |
| *G02B 17/00* | (2006.01) |
| *H05B 3/00* | (2006.01) |

(52) U.S. Cl.
CPC .............. *F26B 3/28* (2013.01); *G02B 5/0891* (2013.01); *G02B 5/10* (2013.01); *G02B 17/002* (2013.01); *G02B 17/006* (2013.01); *G02B 19/0028* (2013.01); *G02B 19/0047* (2013.01); *H01J 61/20* (2013.01); *H05B 3/0038* (2013.01)

(58) Field of Classification Search
CPC ......... H05G 2/00; G03F 7/70; G03F 7/70008; G03F 7/70033

USPC ................. 250/493.1, 494.1, 504 R, 504 H
See application file for complete search history.

(56) References Cited

U.S. PATENT DOCUMENTS

| | | | |
|---|---|---|---|
| 2010/0076111 A1* | 3/2010 | Marson ................. | G03F 7/2024 522/153 |
| 2011/0031894 A1 | 2/2011 | Van De Ven | |
| 2013/0302538 A1* | 11/2013 | Higeta ................... | C09B 31/30 428/1.31 |

FOREIGN PATENT DOCUMENTS

| | | |
|---|---|---|
| CN | 201992375 U | 9/2011 |
| CN | 103085466 A | 5/2013 |
| TW | 200524186 | 7/2005 |
| TW | 200916970 | 4/2009 |

* cited by examiner

*Primary Examiner* — Nicole Ippolito
(74) *Attorney, Agent, or Firm* — Winston Hsu (57) ABSTRACT

An ultraviolet curing module includes a first light source and a second light source. The first light source is configured to emit ultraviolet with a first spectrum. The first spectrum has a first peak wavelength. The second light source is configured to emit ultraviolet with a second spectrum. The second spectrum has a second peak wavelength. Wherein, a difference between the first peak wavelength and the second peak wavelength is greater than 35 nm, and an irradiation range of ultraviolet of the first light source on an irradiated object at least partially overlaps an irradiation range of ultraviolet of the second light source on the irradiated object.

20 Claims, 10 Drawing Sheets

ULTRAVIOLET CURING MODULE

BACKGROUND OF THE INVENTION

1. Field of the Invention

The present invention relates to an ultraviolet curing module, and more particularly, to an ultraviolet curing module capable of emitting ultraviolet with multiple spectrums.

2. Description of the Prior Art

As related technology keeps improving, various kinds of light emitting diodes are developed to apply to different fields. For example, current ultraviolet curing lamps start using ultraviolet light emitting diodes as light sources. However, ultraviolet emitted from the ultraviolet light emitting diode has a narrower spectrum (with only a single peak wavelength). As such, photo initial reaction of an UV curable resin to be irradiated and cured is slower. When the ultraviolet light emitting diode is applied to the ultraviolet curing lamp, ultraviolet of the ultraviolet light emitting diode cannot quickly and efficiently cure the UV curable resin.

SUMMARY OF THE INVENTION

The present invention provides an ultraviolet curing module comprising a first light source and a second light source. The first light source is configured to emit ultraviolet with a first spectrum. The first spectrum has a first peak wavelength. The second light source is configured to emit ultraviolet with a second spectrum. The second spectrum has a second peak wavelength. Wherein, a difference between the first peak wavelength and the second peak wavelength is greater than 35 nm, and an irradiation range of ultraviolet of the first light source on an irradiated object at least partially overlaps an irradiation range of ultraviolet of the second light source on the irradiated object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
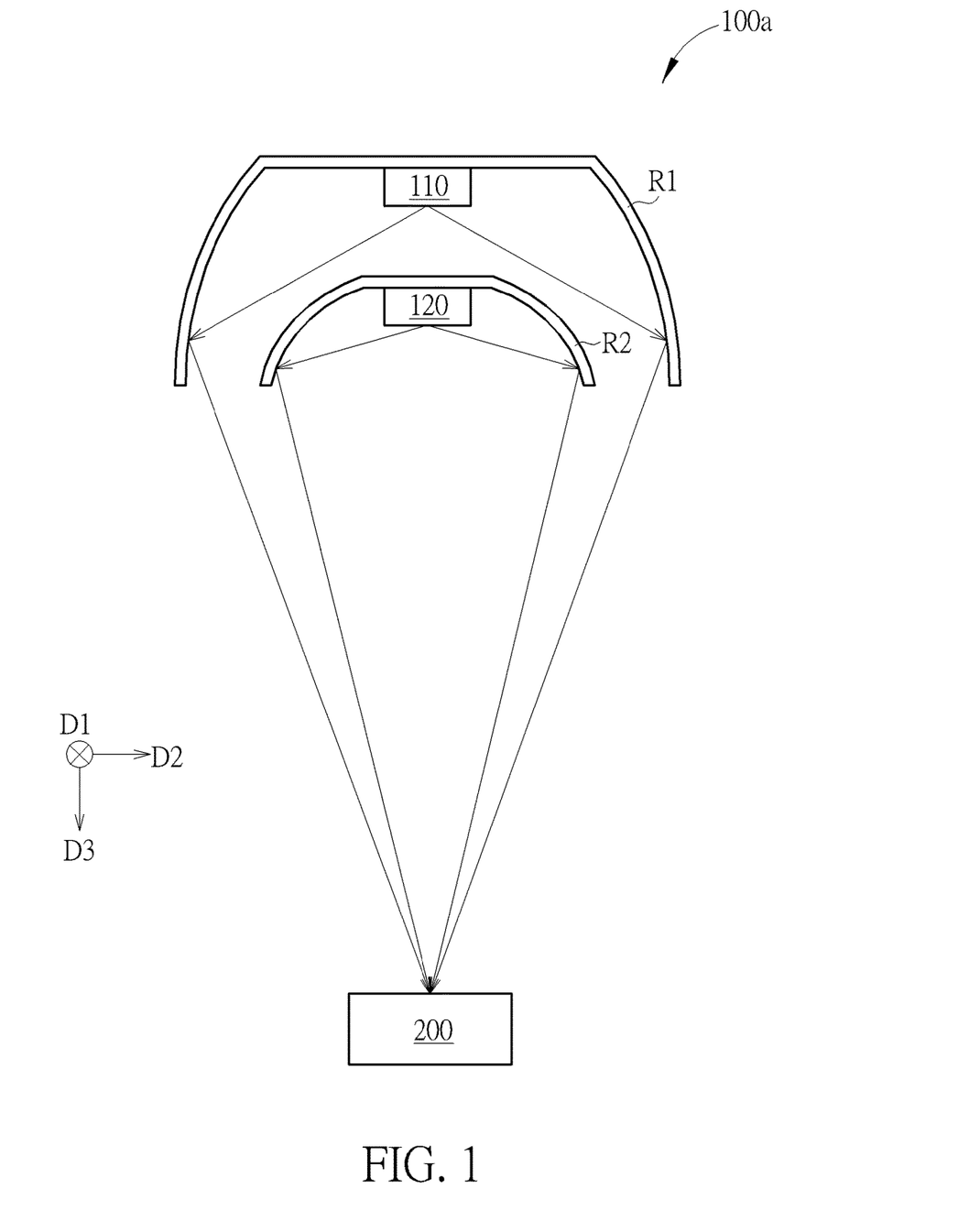
FIG. 1 is a diagram showing a first embodiment of an ultraviolet curing module of the present invention.

Please refer to FIG. 1. FIG. 1 is a diagram showing a first embodiment of an ultraviolet curing module of the present invention. As shown in FIG. 1, the ultraviolet curing module 100a of the present invention comprises a first light source 110, a second light source 120, a first reflective member R1 and a second reflective member R2. The first light source 110 is configured to emit ultraviolet with a first spectrum, and the first spectrum has a first peak wavelength. The second light source 120 is configured to emit ultraviolet with a second spectrum, and the second spectrum has a second peak wavelength. For example, the first light source 110 is configured to emit ultraviolet with the first peak wavelength within an UVA waveband ranges from 315 nm to 420 nm, and the second light source 120 is configured to emit ultraviolet with the second peak wavelength within an UVC waveband ranges from 100 nm to 280 nm. In the present embodiment, a difference between the first peak wavelength and the second peak wavelength is greater than 35 nm. Preferably, the difference between the first peak wavelength and the second peak wavelength is greater than 80 nm. As such, the ultraviolet curing module 100a of the present invention can have higher curing efficiency. Wherein, the first light source 110 and the second light source 120 can comprise ultraviolet light emitting diodes, ultraviolet mercury lamps, or a combination of the ultraviolet light emitting diodes and the ultraviolet mercury lamps.

Figure 2:
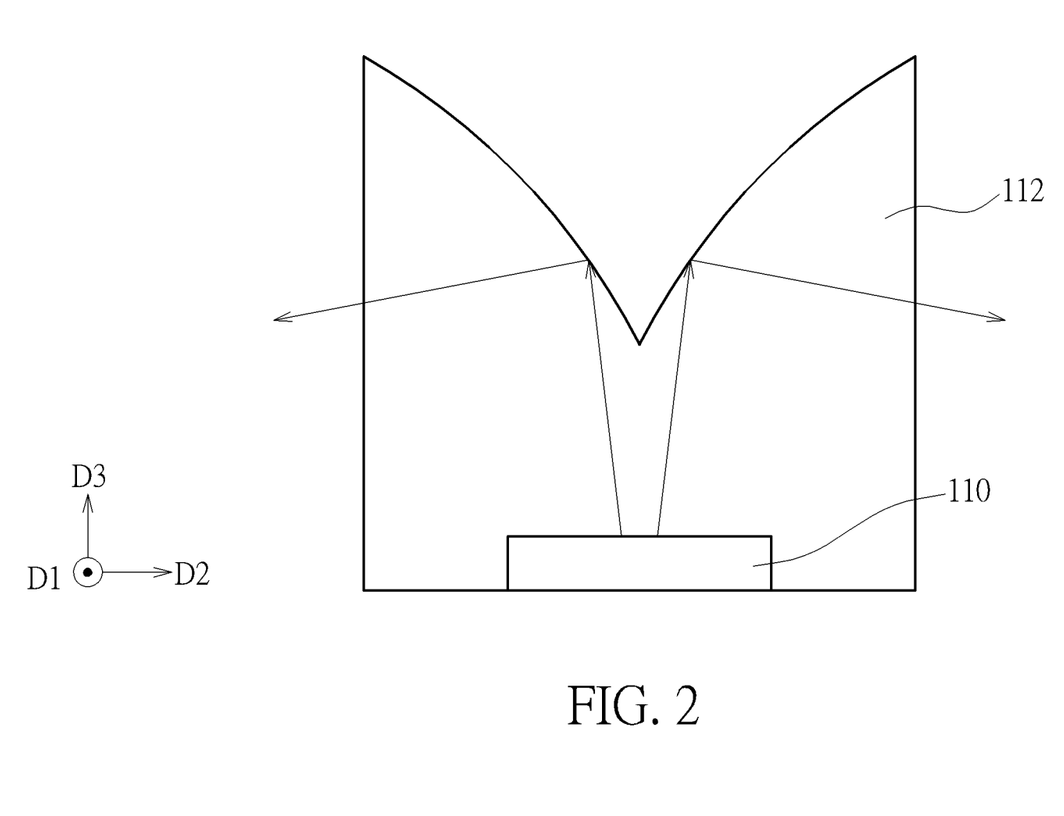
FIG. 2 is a diagram showing a light pattern of a first light source through a first optical lens.

The first reflective member R1 is arranged at one side of the first light source 110 for reflecting ultraviolet of the first light source 110. The second reflective member R2 is arranged at one side of the second light source 120 for reflecting ultraviolet of the second light source 120. Preferably, the first reflective member R1 and the second reflective member R2 are ellipsoidal reflectors, and the first light source 110 and the second light source 120 are respectively arranged on a focal point of the first reflective member R1 and a focal point of the second reflective member R2. In the present embodiment, an optical axis of the first light source 110 is parallel to an optical axis of the second light source 120. The optical axis of the first light source 110 passes through the second light source 120. Therefore, the second reflective member R2 can be omitted. The other focal point of the first reflective member R1 can overlap the other focal point of the second reflective member R2 on an irradiated object 200 (such as an UV curable resin to be cured). As such, when ultraviolet of the first light source 110 and ultraviolet of the second light source 120 are respectively reflected by the first reflective member R1 and the second reflective member R2, an irradiation range of ultraviolet of the first light source 110 on the irradiated object 200 overlaps (or at least partially overlaps) an irradiation range of ultraviolet of the second light source 120 on the irradiated object 200, in order to cure a same region of the irradiated object 200. On the other hand, a curvature of the first reflective member R1 is different from a curvature of the second reflective member R2, such that a focal length of the first reflective member R1 is different from a focal length of the second reflective member R2. Therefore, the first reflective member R1 and the second reflective member R2 can be arranged at different positions according to design requirements, so as to increase design flexibility of the ultraviolet curing module 100a of the present invention and reduce size of the ultraviolet curing module 100a of the present invention. In particular, as shown in FIG. 2, a first optical lens 112 can be arranged on the first light source 110 for refracting most of ultraviolet of the first light source 110 to lateral sides of the first optical lens 112, such that a batwing-shaped light pattern is formed after ultraviolet of the first light source 110 passes through the first optical lens 112. Therefore, most of ultraviolet can be concentrated on the irradiated object 200 after being refracted by the first reflective member R1 without being interfered by the second light source 120, so as to increase curing efficiency. In the present embodiment, the first optical lens can be a total internal reflection (TIR) lens, but the present embodiment is not limited thereto.

According to the above arrangement, the difference between the first peak wavelength of the first light source 110 and the second peak wavelength of the second light source 120 is greater than 35 nm. Therefore, the ultraviolet curing module 100a of the present invention can allow the irradiated object 200 to have a faster initial reaction for ultraviolet in order to efficiently cure resin.

Figure 3:
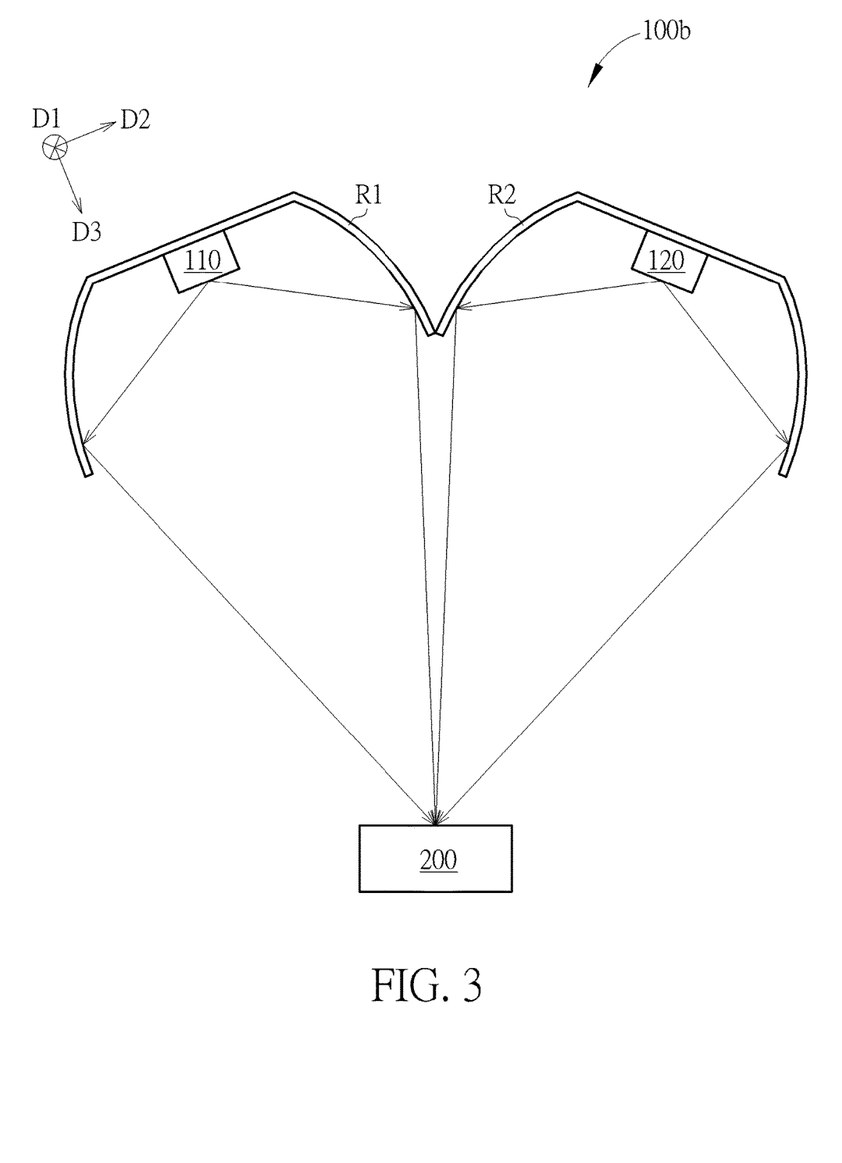
FIG. 3 is a diagram showing a second embodiment of the ultraviolet curing module of the present invention.

Please refer to FIG. 3. FIG. 3 is a diagram showing a second embodiment of the ultraviolet curing module of the present invention. As shown in FIG. 3, the optical axis of the first light source 110 is not parallel to the optical axis of the second light source 120 of the ultraviolet curing module 100b, but the focal point of the first reflective member R1 overlaps the focal point of the second reflective member R2. As such, when ultraviolet of the first light source 110 and ultraviolet of the second light source 120 are respectively reflected by the first reflective member R1 and the second reflective member R2, the irradiation range of ultraviolet of the first light source 110 on the irradiated object 200 overlaps (or at least partially overlaps) the irradiation range of ultraviolet of the second light source 120 on the irradiated object 200, in order to cure the same region of the irradiated object 200. On the other hand, the curvature of the first reflective member R1 can be different from the curvature of the second reflective member R2, such that the focal length of the first reflective member R1 is different from the focal length of the second reflective member R2. Therefore, the first reflective member R1 and the second reflective member R2 can be arranged at different positions or angles according to design requirements, so as to increase design flexibility of the ultraviolet curing module 100b of the present invention and reduce size of the ultraviolet curing module 100b of the present invention.

Figure 4:
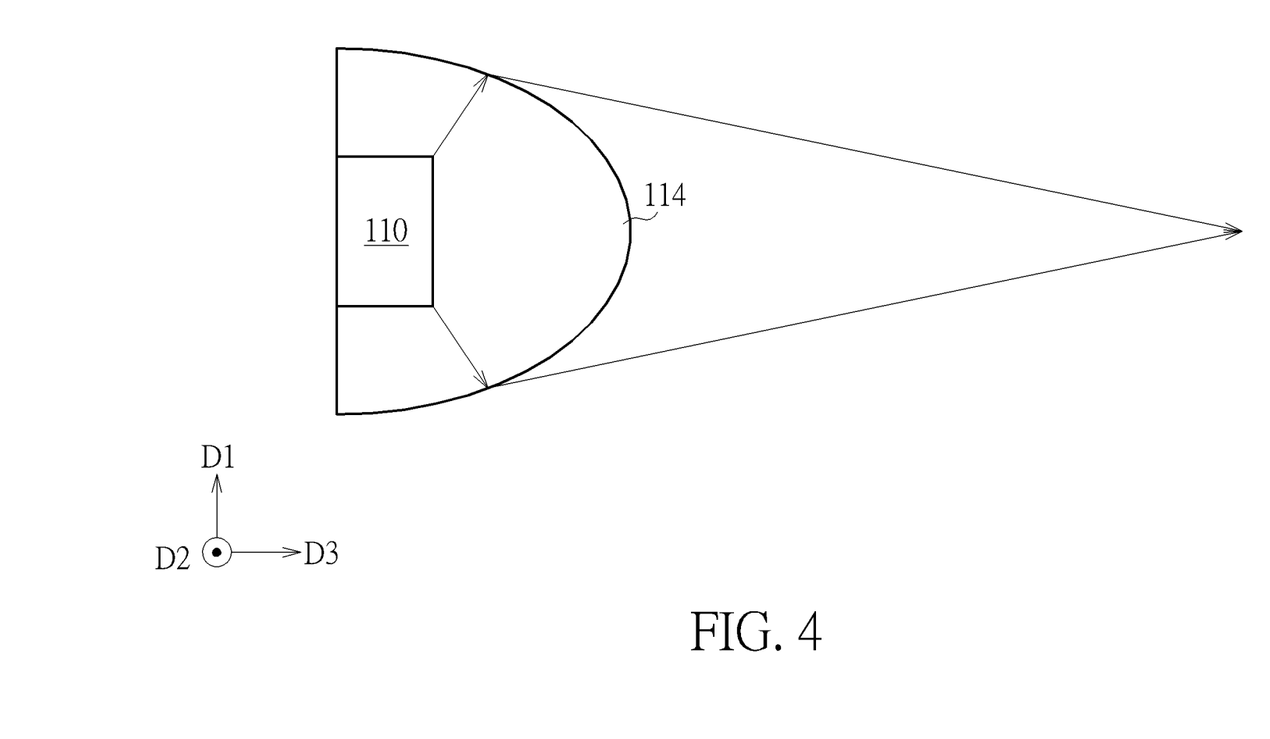
FIG. 4 is a diagram showing a light pattern of the first light source through a second optical lens in a second direction.
Figure 5:
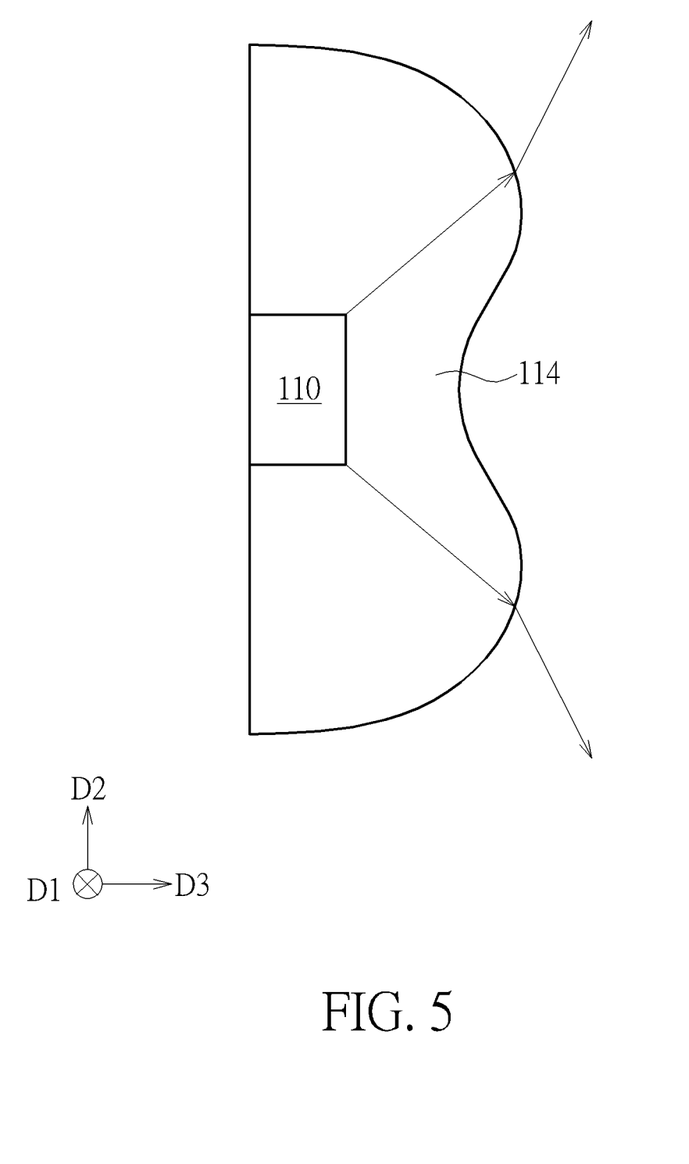
FIG. 5 is a diagram showing a light pattern of the first light source through the second optical lens in a first direction.

Please refer to FIG. 4 and FIG. 5 together. FIG. 4 is a diagram showing a light pattern of the first light source through a second optical lens in a second direction. FIG. 5 is a diagram showing a light pattern of the first light source through the second optical lens in a first direction. As shown in figures, the ultraviolet curing module 100b of the present invention can further comprise a second optical lens 114 arranged on the first light source 110 for refracting ultraviolet of the first light source 110 in order to form a light pattern. The light pattern of the first light source 110 in the second direction D2 has a smaller divergence angle, and the light pattern of the first light source 110 in the first direction D1 has a larger divergence angle. Both the first direction D1 and the second direction D2 are perpendicular to the optical axis of the first light source 110 (a third direction D3). The light pattern of the first light source 110 in the second direction D2 has a first full width at half maximum (a range of a divergence angle corresponding to 50% of a maximum intensity value of light in the second direction D2). The light pattern of the first light source 110 in the first direction D1 has a second full width at half maximum (a range of a divergence angle corresponding to 50% of a maximum intensity value of light in the first direction D1). The first full width at half maximum is smaller than the second full width at half maximum. In the present embodiment, a ratio of the second full width at half maximum to the first full width at half maximum is greater than 5. As such, ultraviolet in the second direction D2 will be directly emitted and concentrated on the irradiated object 200 on the optical axis of the first light source 110, and ultraviolet in the first direction D1 will be diverged toward the first reflective member R1 in order to be reflected and concentrated on the irradiated object 200 by the first reflective member R1. Therefore, irradiating efficiency of the first light source 110 on the irradiated object 200 can be increased. In particular, the second optical lens 114 can also be arranged on the second light source 120 (not shown in figures) in order to increase irradiating efficiency of the second light source 120 on the irradiated object 200. But the present embodiment is not limited thereto.

Figure 6:
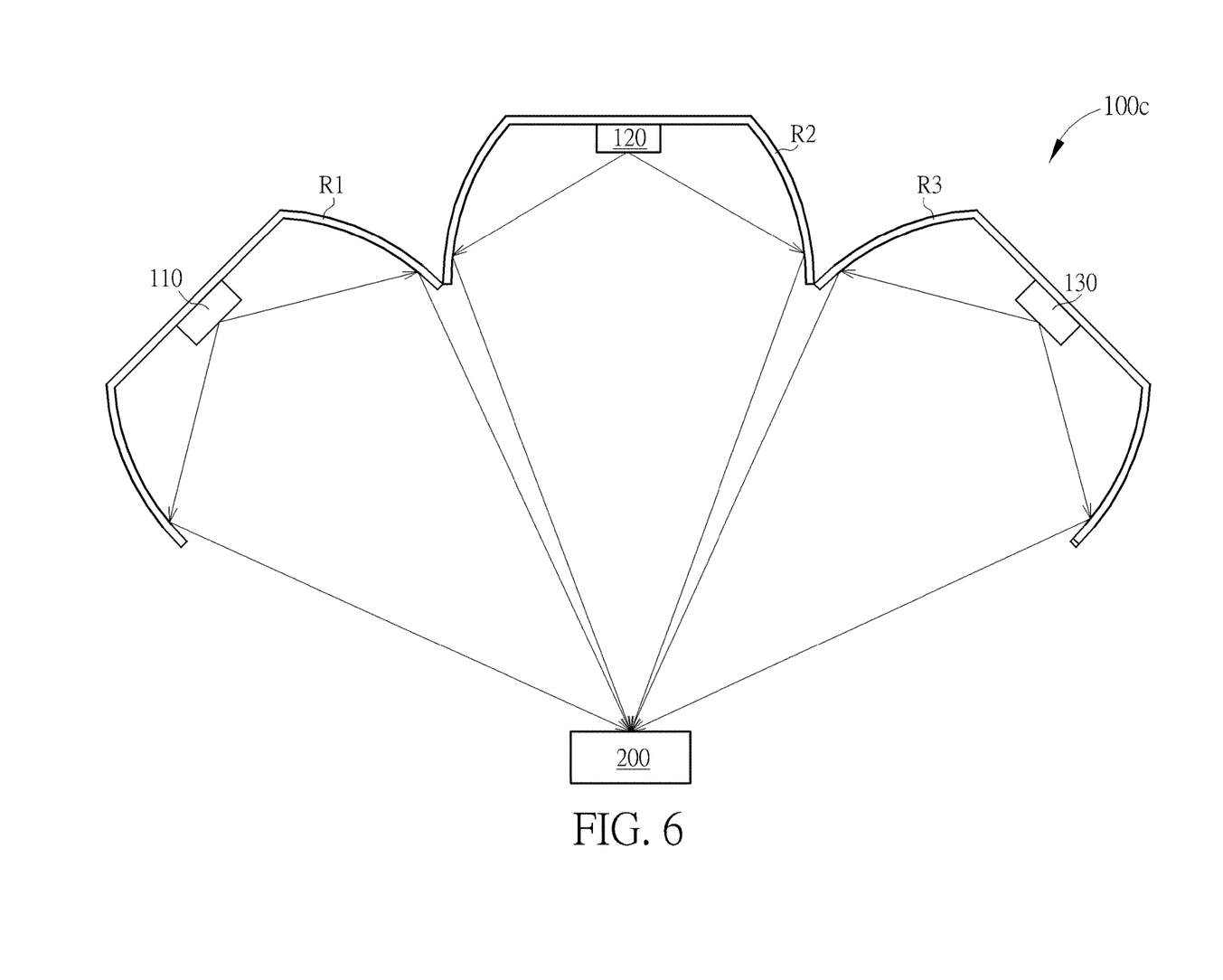
FIG. 6 is a diagram showing a third embodiment of the ultraviolet curing module of the present invention.

Please refer to FIG. 6. FIG. 6 is a diagram showing a third embodiment of the ultraviolet curing module of the present invention. As shown in FIG. 6, the ultraviolet curing module 100c further comprises a third light source 130 and a third reflective member R3. In the present embodiment, the third light source 130 is configured to emit ultraviolet with the first spectrum. For example, the third light source 130 is configured to emit ultraviolet having a wavelength within the UVA waveband. The third light source 130 can also emit ultraviolet with the second spectrum (such as within the UVC waveband) or emit ultraviolet with a spectrum (such as within a UVB waveband) different from the first and second spectrums in order to improve photo initial reaction of the irradiated object 200, but the present embodiment is not limited thereto. Similarly, a second optical lens (not shown in FIG. 6) can also be arranged in front of the third light source 130 for refracting ultraviolet of the third light source to form a light pattern similar to the light pattern of the first light source arranged with the second optical lens (not shown in FIG. 6), in order to increase irradiating efficiency of the third light source 130 on the irradiated object 200. The third reflective member R3 is arranged at one side of the third light source 130 for reflecting ultraviolet of the third light source 130. Focal points of the first to third reflective members R1, R2, R3 overlap each other. As such, when ultraviolet of the first to third light sources 110, 120, 130 is reflected by the first to third reflective member 2 R1, R2, R3 respectively, the irradiation ranges of ultraviolet of the first to third light sources 110, 120, 130 on the irradiated object 200 overlap (at least partially overlap), in order to simultaneously cure the same region of the irradiated object 200. Similarly, curvatures of the first to third reflective members R1, R2, R3 can be different from each other, such that focal lengths of the first to third reflective members R1, R2, R3 are different from each other. Therefore, the first to third reflective members R1, R2, R3 can be arranged at different positions or angles according to design requirements, so as to increase design flexibility of the ultraviolet curing module 100c of the present invention and reduce size of the ultraviolet curing module 100c of the present invention.

Figure 7:
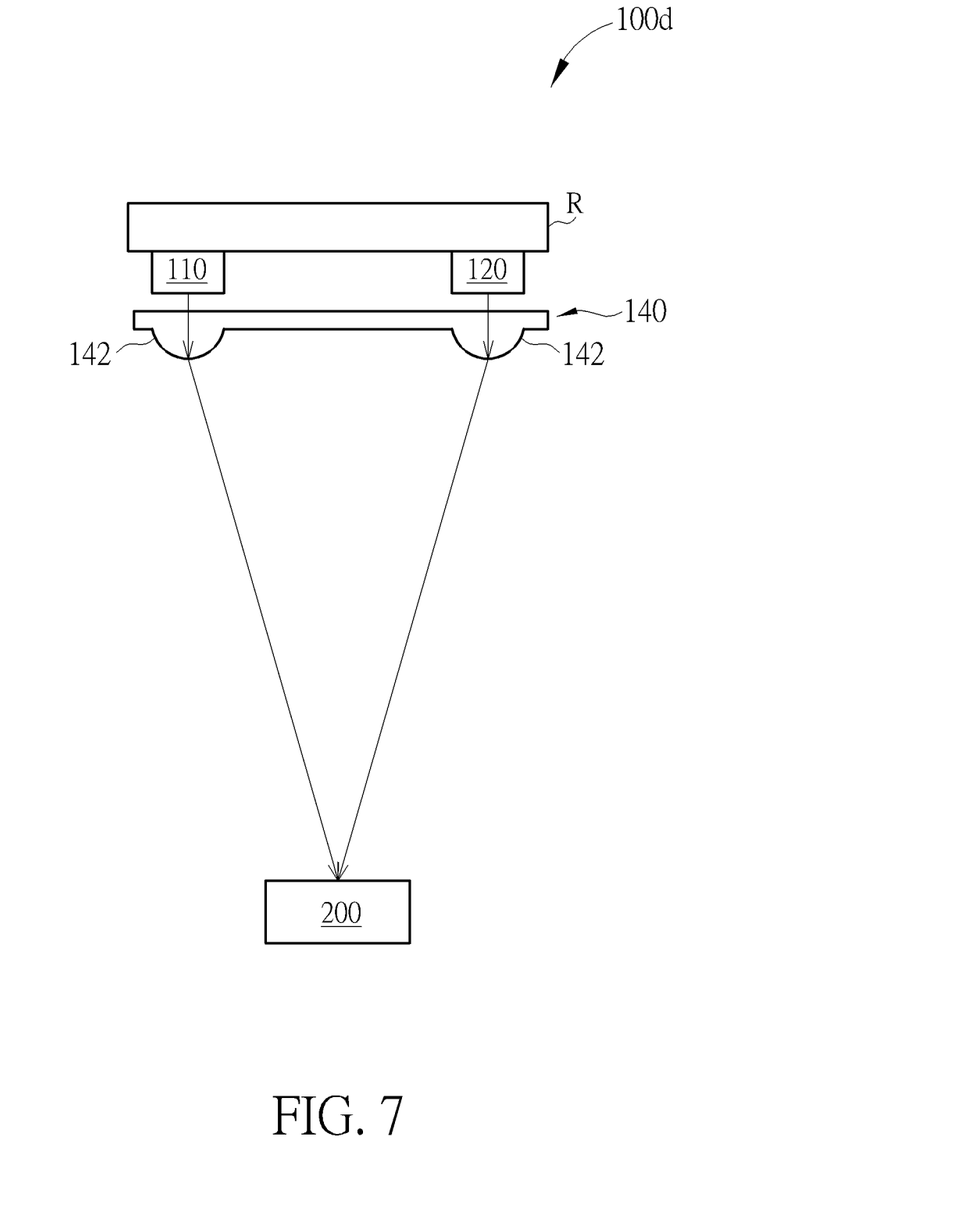
FIG. 7 is a diagram showing a fourth embodiment of the ultraviolet curing module of the present invention.

Please refer to FIG. 7. FIG. 7 is a diagram showing a fourth embodiment of the ultraviolet curing module of the present invention. As shown in FIG. 7, the ultraviolet curing module 100d comprises a first light source 110, a second light source 120 and a lens module 140. The lens module 140 has a plurality of lenses 142 for replacing the first reflective member R1 and the second reflective member R2.

The lenses 142 are correspondingly arranged on optical axes of the first and second light sources 110, 120 for refracting ultraviolet of the first and second light sources 110, 120 to the irradiated object 200. An irradiation range of ultraviolet of the first light source 110 on the irradiated object 200 overlaps (or at least partially overlaps) an irradiation range of ultraviolet of the second light source 120 on the irradiated object 200, in order to cure the same region of the irradiated object 200. The ultraviolet curing module 100d can further comprise a reflective member R arranged at a rear side of the first and second light sources 110, 120 for reflecting more ultraviolet of the first and second light sources 110, 120 to the lens module 140. In particular, the ultraviolet curing module 100d can further comprise a third light source (not shown in FIG. 7) configured to emit ultraviolet. The third light source can emit ultraviolet with a spectrum identical to or different from the spectrums of ultraviolet of the first and second light sources 110, 120, but the present embodiment is not limited thereto.

Figure 8:
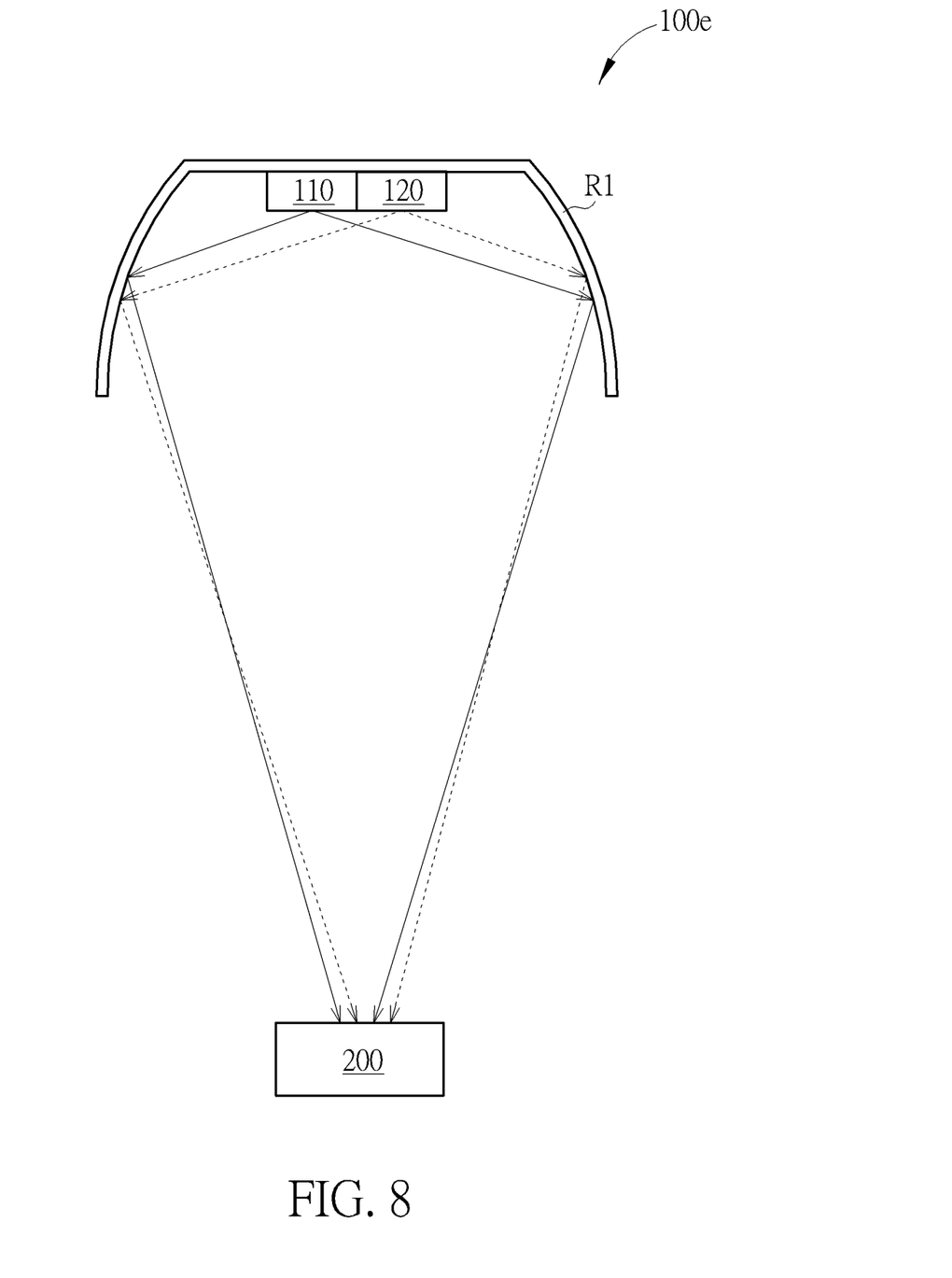
FIG. 8 is a diagram showing a fifth embodiment of the ultraviolet curing module of the present invention.

Please refer to FIG. 8. FIG. 8 is a diagram showing a fifth embodiment of the ultraviolet curing module of the present invention. As shown in FIG. 8, the ultraviolet curing module 100e comprises a first light source 110, a second light source 120 and a first reflective member R1. The first reflective member R1 is configured to reflect ultraviolet of the first light source 110 and the second light source 120. The first light source 110 is arranged adjacent to the second light source 120, and an optical axis of the first light source 110 is parallel to an optical axis of the second light source 120. When ultraviolet of the first light source 110 and the second light source 120 is reflected by the first reflective member R1, an irradiation range of ultraviolet of the first light source 110 on the irradiated object 200 at least partially overlaps an irradiation range of ultraviolet of the second light source 120 on the irradiated object 200, so as to simultaneously cure the same region of the irradiated object 200. In particular, the first light source 110 can be arranged on a focal point of the first reflective member R1, and the second light source 120 can be arranged away from the focal point, such that ultraviolet of the first light source 110 can be effectively concentrated on the irradiated object 200.

Figure 9:
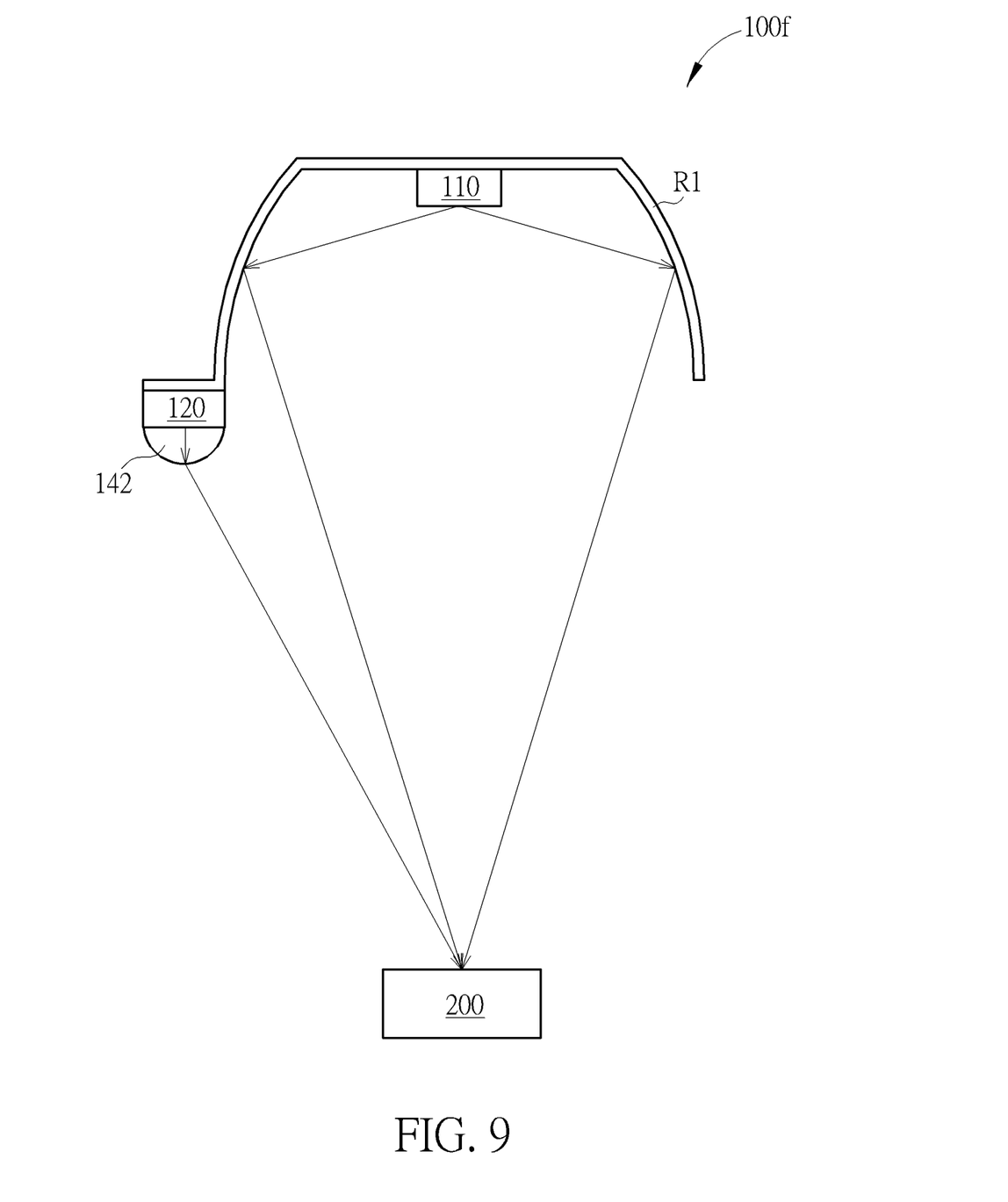
FIG. 9 is a diagram showing a sixth embodiment of the ultraviolet curing module of the present invention.

Please refer to FIG. 9. FIG. 9 is a diagram showing a sixth embodiment of the ultraviolet curing module of the present invention. As shown in FIG. 9, the ultraviolet curing module 100f comprises a first light source 110, a second light source 120, a first reflective member R1 and a lens 142. The first reflective member R1 is arranged at one side of the first light source 110 for reflecting ultraviolet of the first light source 110 to the irradiated object 200. The second light source 120 is arranged at one end of the first reflective member R1. The lens 142 is arranged on an optical axis of the second light source 120 for refracting ultraviolet of the second light source 120 to the irradiated object 200. An irradiation range of ultraviolet of the first light source 110 on the irradiated object 200 overlaps (at least partially overlaps) an irradiation range of ultraviolet of the second light source 120 on the irradiated object 200, so as to simultaneously cure the same region of the irradiated object 200.

Figure 10:
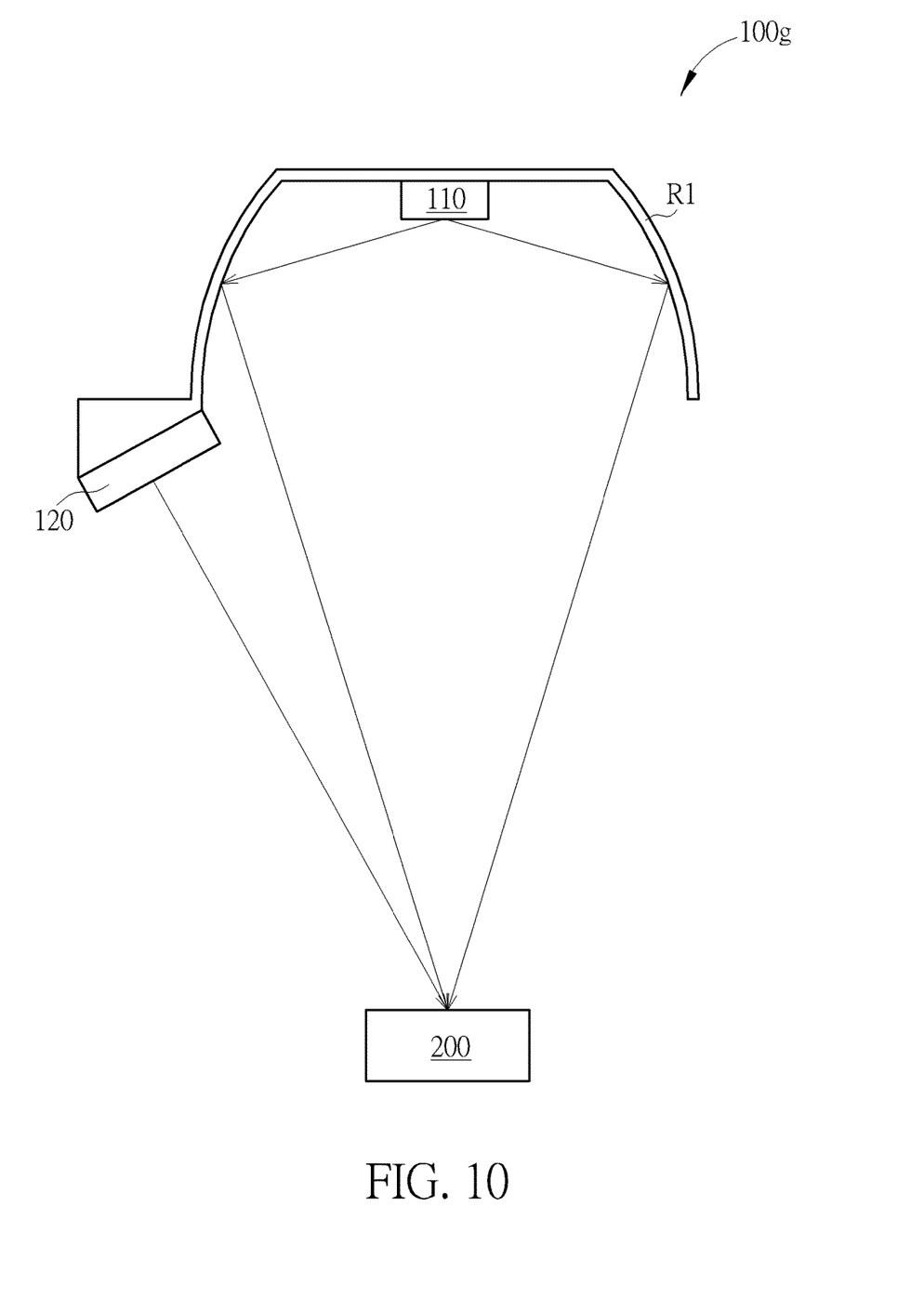
FIG. 10 is a diagram showing a seventh embodiment of the ultraviolet curing module of the present invention.

Please refer to FIG. 10. FIG. 10 is a diagram showing a seventh embodiment of the ultraviolet curing module of the present invention. As shown in FIG. 10, the ultraviolet curing module 100g comprises a first light source 110, a second light source 120 and a first reflective member R1. The first reflective member R1 is arranged at one side of the first light source 110 for reflecting ultraviolet of the first light source 110 to the irradiated object 200. The second light source 120 is obliquely arranged at one end of the first reflective member R1 for directly irradiating the irradiated object 200. An irradiation range of ultraviolet of the first light source 110 on the irradiated object 200 overlaps (at least partially overlaps) an irradiation range of ultraviolet of the second light source 120 on the irradiated object 200, so as to simultaneously cure the same region of the irradiated object 200.

In the aforementioned figures, arrangements of the ultraviolet curing module of the present invention are provided for illustration. The present invention is not limited thereto. In other embodiments of the present invention, positions, angles and numbers of the light sources, the reflective members and the lenses can be changed according to design requirements.

In addition, the first light source 110 can comprise an ultraviolet light emitting diode having a single peak wavelength for emitting ultraviolet having a major wavelength allowing the irradiated object 200 to perform photo initial reaction. A grain size of the ultraviolet light emitting diode is preferred to be greater than 80 mil, in order to have a stronger light intensity. When the first light source 110 comprises a plurality of ultraviolet light emitting diodes, the plurality of ultraviolet light emitting diodes can be arranged along a straight line, such as being arranged along the first direction D1.

On the other hand, in the above embodiments, the second light source 120 can comprise an ultraviolet mercury lamp for emitting ultraviolet having a plurality of secondary peak wavelengths with intensity smaller than intensity of the second peak wavelength, such that the irradiated object 200 can have a better photo initial reaction. But the present invention is not limited thereto. When the second light source 120 comprises the ultraviolet mercury lamp, temperature rise efficiency of the second light source 120 to the irradiated object 200 is greater than temperature rise efficiency of the first light source 110 to the irradiated object 200. Therefore, the irradiated object 200 can be heated and cured during the curing process, in order to have better curing efficiency. Moreover, the first light source 110 and the second light source 120 are not limited to being turned on at the same time. The first light source 110 and the second light source 120 can be turned on at different time points.

In contrast to the prior art, the ultraviolet curing module of the present invention comprises a plurality of light sources capable of emitting ultraviolet with different spectrums, in order to irradiate the same region of the irradiated object for improving photo initial reaction of the irradiated object. Therefore, the ultraviolet curing module of the present is capable of improving curing efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultraviolet curing module, comprising:
 a first light source configured to emit ultraviolet with a first spectrum, the first spectrum having a first peak wavelength; and
 a second light source configured to emit ultraviolet with a second spectrum, the second spectrum having a second peak wavelength;
 wherein a difference between the first peak wavelength and the second peak wavelength is greater than 35 nm;
 the first-spectrum ultraviolet generated by the first light source and the second-spectrum ultraviolet generated by the second light source are focused on the irradiated object and an irradiation range of ultraviolet of the first light source on an irradiated object at least partially overlaps an irradiation range of ultraviolet of the second light source on the irradiated object.

2. The ultraviolet curing module of claim 1, wherein an optical axis of the first light source is parallel to an optical axis of the second light source.

3. The ultraviolet curing module of claim 1, wherein the first peak wavelength is within a range from 315 nm to 420 nm, and the second peak wavelength is within a range from 100 nm to 280 nm.

4. The ultraviolet curing module of claim 1, further comprising a first reflective member arranged at one side of the first light source for reflecting ultraviolet of the first light source.

5. The ultraviolet curing module of claim 4, further comprising an optical lens arranged on the first light source for refracting most of ultraviolet of the first light source to lateral sides of the optical lens.

6. The ultraviolet curing module of claim 4, further comprising a second reflective member arranged at one side of the second light source for reflecting ultraviolet of the second light source.

7. The ultraviolet curing module of claim 6, further comprising at least one optical lens configured to refract ultraviolet of the first light source and/or the second light source in order to form a light pattern, wherein the light pattern has a first full width at half maximum in a second direction, the light pattern has a second full width at half maximum in a first direction, a ratio of the second full width at half maximum to the first full width at half maximum is greater than 5, both of the first direction and the second direction are perpendicular to the optical axis of the first light source.

8. The ultraviolet curing module of claim 6, wherein a focal point the first reflective member overlaps a focal point of the second reflective member.

9. The ultraviolet curing module of claim 8, wherein a curvature of the first reflective member is different from a curvature of the second reflective member.

10. The ultraviolet curing module of claim 6, further comprising:
a third light source configured to emit ultraviolet; and
a third reflective member arranged at one side of the third light source for reflecting ultraviolet of the third light source;
wherein irradiation ranges of ultraviolet of the first light source to the third light source on the irradiated object at least partially overlap.

11. The ultraviolet curing module of claim 6, wherein an optical axis of the first light source passes through the second reflective member.

12. The ultraviolet curing module of claim 4, wherein the second light source is arranged at one end of the first reflective member.

13. The ultraviolet curing module of claim 12, wherein the first light source is disposed on a first plane vertical to the optical axis of the first light source, the second light source is disposed on a second plane vertical to the optical axis of the first light source, and the first plane is different from the second plane.

14. The ultraviolet curing module of claim 12, wherein the second light source is obliquely arranged at the one end of the first reflective member.

15. The ultraviolet curing module of claim 4, wherein the first light source is arranged on a focal point of the first reflective member, and the second light source is arranged away from the focal point of the first reflective member.

16. The ultraviolet curing module of claim 1, further comprising at least one lens, the at least one lens being arranged on the optical axis of the first light source and/or the second light source for refracting ultraviolet of the first light source and/or the second light source, wherein the irradiation range of ultraviolet of the first light source on the irradiated object at least partially overlaps the irradiation range of ultraviolet of the second light source on the irradiated object.

17. The ultraviolet curing module of claim 1, wherein the first spectrum has a single peak wavelength, the second spectrum has a plurality of secondary peak wavelengths with intensity smaller than intensity of the second peak wavelength.

18. The ultraviolet curing module of claim 17, wherein the first light source comprises an ultraviolet light emitting diode or an ultraviolet light emitting diode array, the second light source comprises an ultraviolet mercury lamp.

19. The ultraviolet curing module of claim 1, wherein temperature rise efficiency of the second light source to the irradiated object is greater than temperature rise efficiency of the first light source to the irradiated object.

20. The ultraviolet curing module of claim 1, wherein an optical axis of the first light source passes through the second light source.

* * * * *